(12) United States Patent
Donnelly

(10) Patent No.: US 9,898,147 B2
(45) Date of Patent: Feb. 20, 2018

(54) MESH ELECTRODE MATRIX HAVING FINITE REPEAT LENGTH

(71) Applicant: Microsoft Technology Licensing, LLC, Redmond, WA (US)

(72) Inventor: Sean M. Donnelly, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 292 days.

(21) Appl. No.: 14/569,502

(22) Filed: Dec. 12, 2014

(65) Prior Publication Data

US 2016/0170518 A1  Jun. 16, 2016

(51) Int. Cl.
G06F 3/044 (2006.01)
G06F 3/041 (2006.01)
G06F 3/047 (2006.01)

(52) U.S. Cl.
CPC ............. *G06F 3/044* (2013.01); *G06F 3/047* (2013.01); *G06F 3/0412* (2013.01); *G06F 2203/04108* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 8,599,150 B2 | 12/2013 | Philipp | |
| 2010/0123670 A1 | 5/2010 | Philipp | |
| 2011/0148781 A1 | 6/2011 | Chen et al. | |
| 2013/0017321 A1 | 1/2013 | Kim et al. | |
| 2013/0021289 A1 | 1/2013 | Chen et al. | |
| 2013/0207911 A1 | 8/2013 | Barton et al. | |

(Continued)

FOREIGN PATENT DOCUMENTS

| | | | | |
|---|---|---|---|---|
| CN | 102147540 A | | 8/2011 | |
| EP | 2720119 A2 | * | 4/2014 | ........... G06F 1/1692 |

(Continued)

OTHER PUBLICATIONS

ISA European Patent Office, International Search Report and Written Opinion Issued in Application No. PCT/US2015/062880, dated Feb. 12, 2016, WIPO, 11 pages.

(Continued)

*Primary Examiner* — Amare Mengistu
*Assistant Examiner* — Shawna Stepp Jones
(74) *Attorney, Agent, or Firm* — Alleman Hall Creasman & Tuttle LLP

(57) ABSTRACT

An array of electrodes is comprised of a plurality of electrodes. Each electrode extends along a first direction X, and is periodically arrayed along a second direction Y perpendicular to X at a pitch $p_e$. Each electrode further comprises a continuous periodic metal mesh having a square unit cell of edge length $p_m$, the square unit cell having axes displaced by an oblique angle θ from X and Y The array is configured such that $θ=\arctan(a/b)$ and $p_m=n*p_e/(m*\sqrt{a^2+b^2})$, where a, b, m, and n are positive integers. In this way, the electrodes repeat with a finite repeat length, while rendering the common edges of the repeating units visually imperceptible by a user.

20 Claims, 7 Drawing Sheets

(56) References Cited

U.S. PATENT DOCUMENTS

| | | |
|---|---|---|
| 2013/0299222 A1 | 11/2013 | Lee et al. |
| 2014/0002378 A1 | 1/2014 | Kim et al. |
| 2014/0043280 A1 | 2/2014 | Cok |
| 2014/0055403 A1 | 2/2014 | Cok |
| 2014/0152580 A1 | 6/2014 | Weaver et al. |
| 2015/0378477 A1 | 12/2015 | Yoshiki |

FOREIGN PATENT DOCUMENTS

| | | |
|---|---|---|
| WO | 2014021225 A1 | 2/2014 |
| WO | 2014129298 A1 | 8/2014 |

OTHER PUBLICATIONS

Byun, et al., "An Efficient Simulation and Analysis Method of Moire Patterns in Display Systems", In Proceedings of Optics Express, vol. 22, Issue 3, Feb. 10, 2014, 9 pages.

* cited by examiner

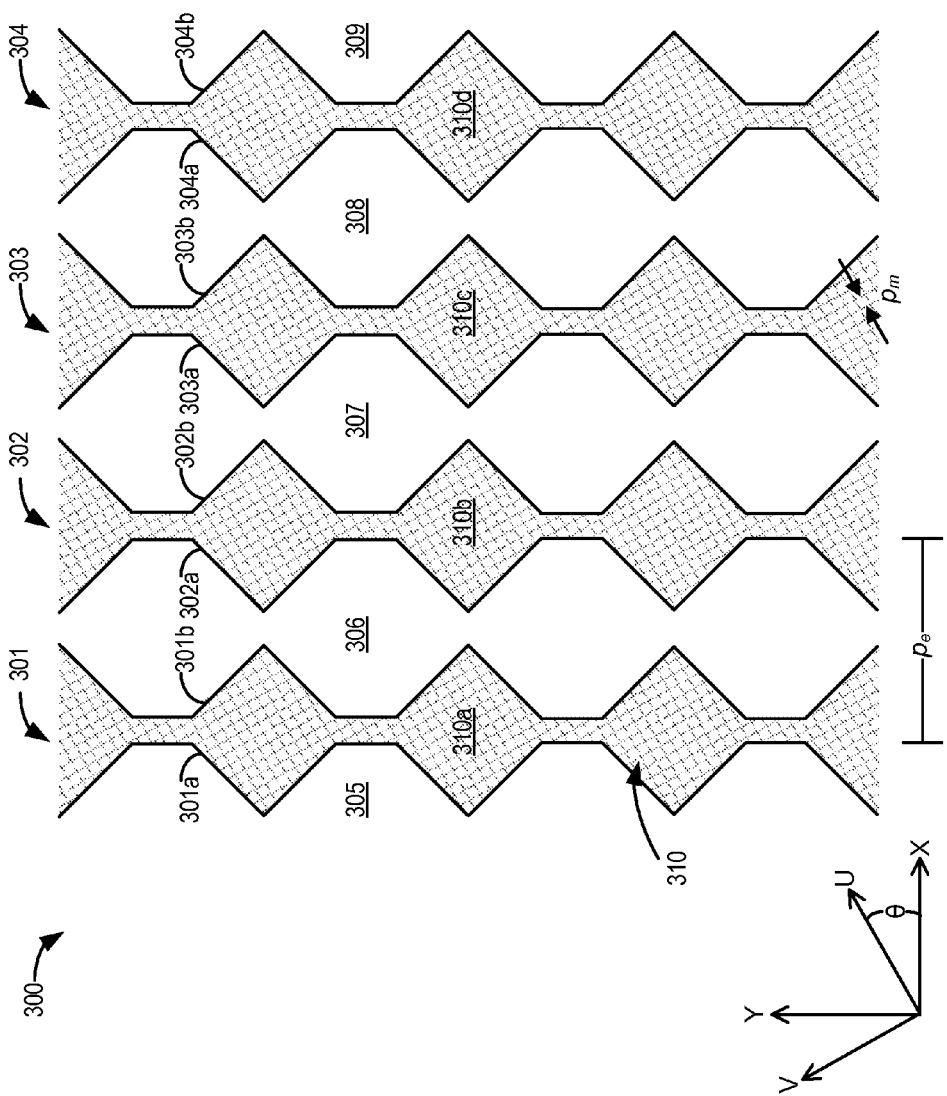

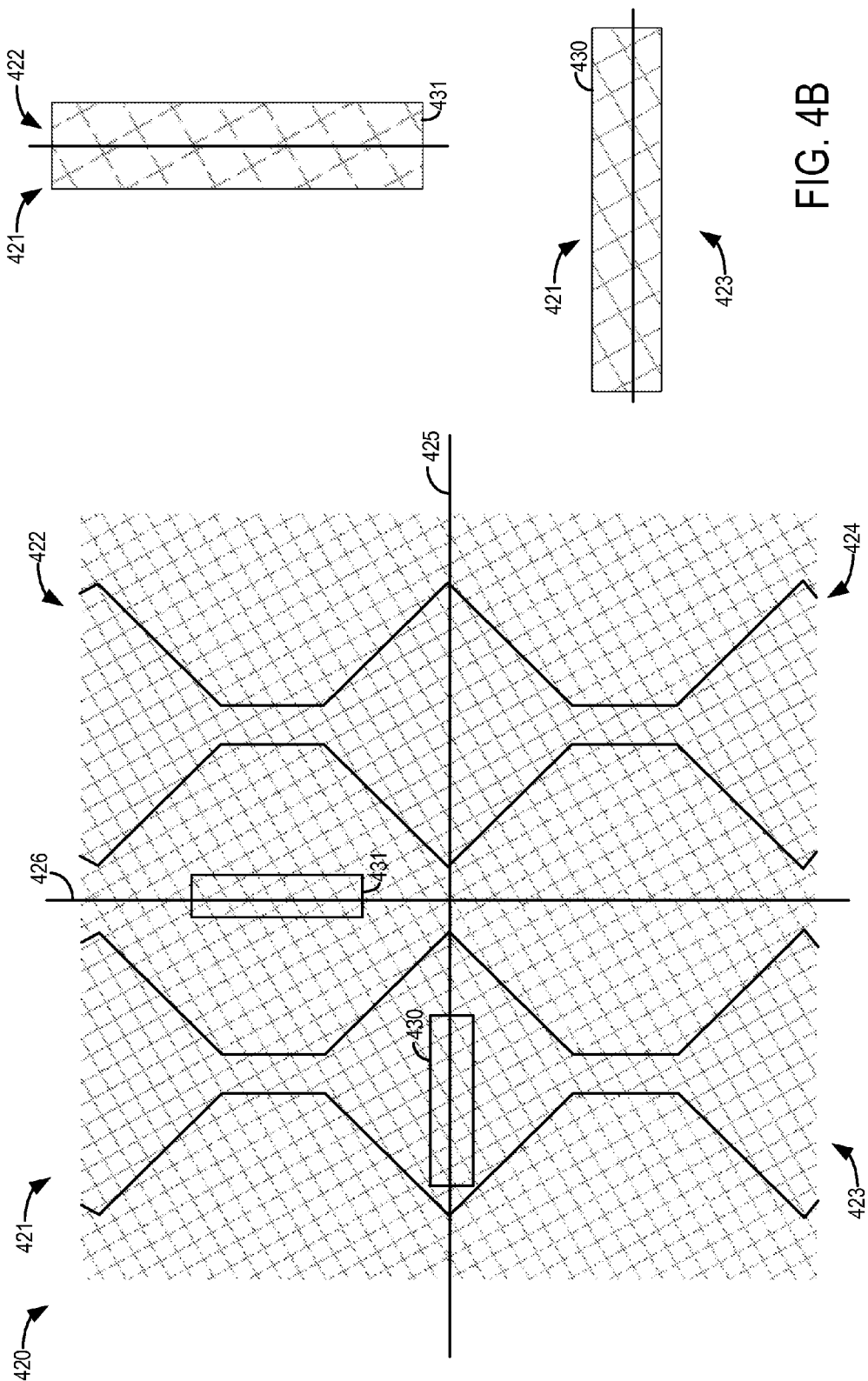

_(54)_ MESH ELECTRODE MATRIX HAVING FINITE REPEAT LENGTH

BACKGROUND

Capacitive touch sensors may comprise an array of electrically conducting electrodes, each electrode comprised of a metal electrode mesh. Applying such sensors to large format displays may require hundreds of electrodes and tens of millions of mesh elements forming unique electrode geometries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An array of electrodes is comprised of a plurality of electrodes. Each electrode extends along a first direction X, and is periodically arrayed along a second direction Y perpendicular to X at a pitch $p_e$. Each electrode further comprises a continuous periodic metal mesh having a square unit cell of edge length $p_m$, the square unit cell having axes displaced by an oblique angle $\theta$ from X and Y. The array is configured such that $\theta = \arctan(a/b)$ and $p_m = n \cdot p_e/(m \cdot \sqrt{a^2+b^2})$, where a, b, m, and n are positive integers. In this way, the electrodes repeat with a finite repeat length, while rendering the common edges of the repeating units visually imperceptible by a user.

BRIEF DESCRIPTION OF THE DRAWINGS

FIG. 3 shows an example metal-mesh electrode array for a capacitive touch sensor.

FIG. 4B shows a detailed view of edges of adjacent step-and-repeat units as shown in FIG. 4A.

DETAILED DESCRIPTION

Figure 1:
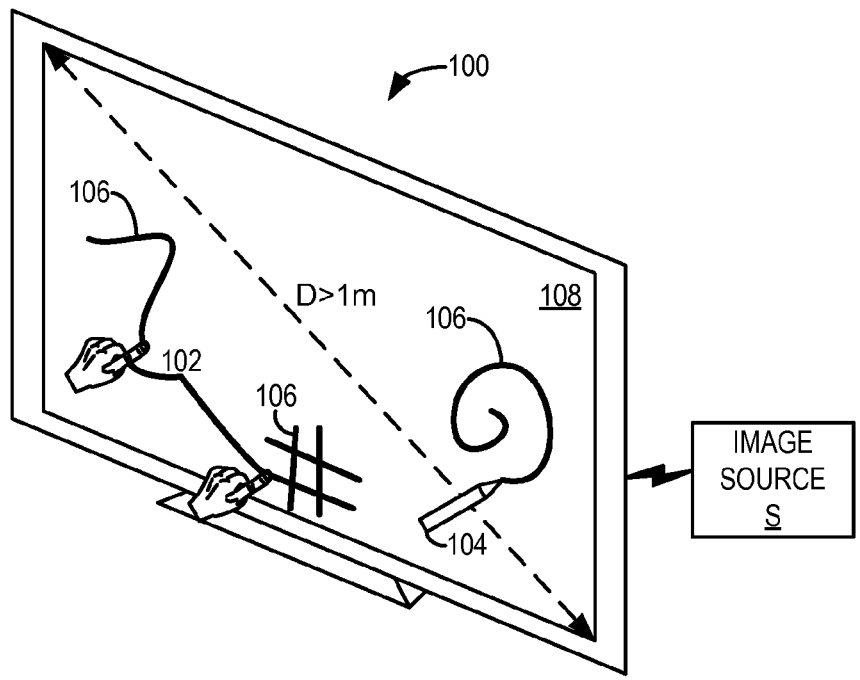
FIG. 1 is a perspective view of a large format multi-touch display device in accordance with one embodiment of the present disclosure.

A capacitive touch sensor may consist of a matrix of electrically conducting transmit and receive electrodes, with electronics to measure the capacitance between transmit and receive electrodes. The proximity of a user's finger or other object may cause a change in the measured capacitance. The spacing of electrodes in a capacitive touch sensor is constrained by performance and cost considerations. For example, a smaller electrode pitch may increase the spatial precision of measurement, but may also increase the cost of transmit and receive electronics. Further, decreasing electrode pitch may degrade the sensitivity of the touch sensor. For a given electrode pitch, the number of electrodes, and thus electronics cost, is typically minimized by orienting the electrodes along the display's rows or columns of pixels.

When used with a display device, a capacitive touch sensor is typically attached to the user-facing surface of the display, to maximize the capacitance change. To avoid obstructing the user's view of the display panel, the sensor's electrodes may consist either of an optically transparent, electrically conductive material, or of an opaque electrically conductive material of low areal solidity, such as a mesh of narrow metal conductors. Because the available transparent conductive materials have relatively low electrical conductivity, metal mesh electrodes are presently favored for capacitive touch sensors requiring electrodes exceeding roughly 0.5 meters in length.

Metal mesh electrodes may be fabricated by a wide variety of manufacturing processes. For example, commonly used material-additive processes include intaglio printing of a conductive (e.g. silver-loaded) ink, and flexographic printing of a material that selectively promotes subsequent chemical deposition of metal. Commonly used material-subtractive processes include selective chemical etching and silver halide photography. In general, fabrication processes require a master tool such as an embossing roller (for intaglio printing), printing plate, or photomask that contains every detail of the electrodes and their constituent meshes (or their inverse, as in a negative-tone photoprocess).

It is well known that any superposition of two or more unlike periodic structures, or of identical periodic structures having a relative angular displacement, will produce moiré effects. Such effects undesirably arise when a touch sensor containing metal mesh electrodes is attached to a pixelated electronic display, such as an AMLCD or AMOLED device, in a touch display system. For a given display device, the visibility of such moiré effects is strongly dependent upon the spacing and directions of periodicity of the mesh openings. In most cases, the choice of these parameters is narrowly constrained by the need to minimize moiré visibility. The pattern of mesh openings must be oriented at specific oblique angles relative to the columns and rows of display pixels, with the openings spaced apart by specific non-integer multiples of the pixel pitch.

Each adjacent electrode may be separated by an inter-electrode alley. Because variations in display occlusion are readily visible to users as unwanted luminance contrasts, it is desirable that the metal mesh fill not only the electrodes (electrode mesh), but also the inter-electrode alleys (alley mesh) (See FIGS. 4A and 5A and related disclosure). Even where the mesh lines are too small for users to visually resolve, users may more easily perceive the electrode boundaries unless the lines comprising the alley meshes are aligned with those of the electrode meshes. This generally requires that all electrodes and inter-electrode alleys in one plane of the touch sensor be derived from a continuous mesh covering the entire display, interrupted by small gaps along the boundaries of the electrodes and within the alley mesh to provide electrical isolation.

Because this common mesh pattern is oriented obliquely to the electrodes, the boundaries of the electrodes cross the mesh differently from electrode to electrode. Indeed, in general, each electrode is geometrically unique. The design complexity is further greatly increased in the case of reentrant electrode shapes, such as a linked-diamond shape, which is commonly used to increase the sensitivity of capacitive touch sensors. In such cases, each individual diamond of each electrode is geometrically unique.

For a large touch sensor containing hundreds of electrodes, tens of thousands of diamonds, and tens of millions of mesh elements, this poses two major practical limitations in the design and fabrication of a master tool. First, the number of unique cases exceeds the computational limits of available CAD/CAM systems for the generation of mask works or tool paths. Second, step-and-repeat processes cannot be used during tool mastering. These limitations have been obstacles to the widespread manufacture of metal mesh touch sensors to date.

Other manufacturers have bypassed this problem by generating the mesh and gaps using two independent processes, so that the two designs can be decoupled. For example, one might fabricate a uniform metal mesh, and then use laser ablation to sever the mesh along the electrode boundaries. In this example, it may not be necessary to create a master tool containing many unique cases. However, this method is much more time consuming and costly than methods utilizing a single photolithographic process. Practitioners of the intaglio process can obtain an equivalent result by machining a grooved negative tool for a uniform mesh, replicating the grooved negative tool to create a ridged positive tool, grooving the positive tool to interrupt the ridges along the mesh boundaries, then using the positive tool to emboss the sensor substrate. However, this process is limited by high tooling costs, short positive tool lifetime, and high rates of electrical and cosmetic defects.

FIG. 1 shows a large format multi-touch display device 100 in accordance with an embodiment of the present disclosure. Display device 100 may have a diagonal dimension greater than 1 meter, for example. In other, particularly large-format embodiments, the diagonal dimension may be 55 inches or greater. Display device 100 may be configured to sense multiple sources of touch input, such as touch input applied by a digit 102 of a user or a stylus 104 manipulated by the user. Display device 100 may be connected to an image source S, such as an external computer or onboard processor. Image source S may receive multi-touch input from display device 100, process the multi-touch input, and produce appropriate graphical output 106 in response. Image source S is described in greater detail below with reference to FIG. 6.

Figure 2:
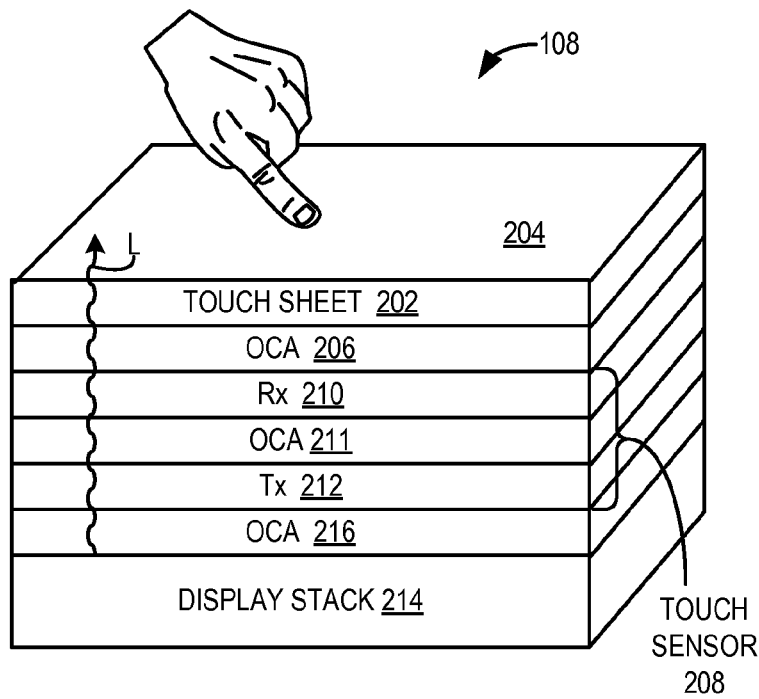
FIG. 2 is a cross-sectional view of an optical stack for a capacitive touch sensitive display of the large format multi-touch display device of FIG. 1.

Display device 100 may include a capacitive touch-sensitive display 108 to enable multi-touch sensing functionality. A schematic view of a partial cross section of an optical stack for capacitive touch-sensitive display 108 is shown in FIG. 2. In this embodiment, display 108 includes an optically clear touch sheet 202 having a top surface 204 for receiving touch input, and an optically clear adhesive (OCA) layer 206 bonding a bottom surface of touch sheet 202 to a top surface of a touch sensor 208. Touch sheet 202 may be comprised of a suitable material, such as glass or plastic. Those of ordinary skill in the art will appreciate that optically clear adhesives (OCAs) refer to a class of adhesives that transmit substantially all (e.g., about 99%) of visible light that is incident upon them.

As discussed in further detail below with reference to FIGS. 3, 4A-4B, and 5A-5B, touch sensor 208 is equipped with a matrix of electrodes comprising capacitive elements positioned a distance below touch sheet 202. As shown, the electrodes may be formed in two separate layers: a receive electrode layer 210 and a transmit electrode layer 212, which may each be formed on a respective dielectric substrate comprising materials including but not limited to glass, polyethylene terephthalate (PET), polycarbonate (PC), or cyclic olefin polymer (COP) film. Receive and transmit electrode layers 210 and 212 may be bonded together by a second optically clear adhesive (OCA) layer 211. Adhesive layer 211 may be an acrylic pressure-sensitive adhesive film, for example. In other embodiments, however, layers 210, 211, and 212 may be integrally formed as a single layer with electrodes disposed on opposite surfaces of the integral layer.

Electrode layers 210 and 212 may be formed by a variety of suitable processes. Such processes may include deposition of metallic wires onto the surface of an adhesive, dielectric substrate; patterned deposition of a material that selectively promotes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing.

In one example, metalized sensor films may be disposed on a user-facing side of a substrate, with the metal facing away from the user or alternatively facing toward the user with a protective sheet (e.g., comprised of PET) between the user and metal. Although a transparent conductive oxide (TCO) (e.g. tin-doped indium oxide (ITO)) is typically not used in the electrodes, partial use of TCO to form a portion of the electrodes with other portions being formed of metal is possible.

In one example, the electrodes may be thin metal of substantially constant cross section, and may be sized such that they may not be optically resolved and may thus be unobtrusive as seen from a perspective of a user. Materials from which electrodes may be formed include various suitable metals (e.g., aluminum, copper, nickel, silver, gold, etc.), metallic alloys, conductive allotropes of carbon (e.g., graphite, fullerenes, amorphous carbon, etc.), conductive polymers, and conductive inks (e.g., made conductive via the addition of metal or carbon particles).

Receive electrode layer 210 may be designated a column electrode layer in which electrodes are at least partially aligned to a longitudinal axis (illustrated as a vertical axis), while transmit electrode layer 212 may be designated a row electrode layer in which electrodes are at least partially aligned to a lateral axis (illustrated as a horizontal axis). Such designation, however, is arbitrary and may be reversed. It will be appreciated that the vertical and horizontal axes depicted herein and other vertical and horizontal orientations are relative, and need not be defined relative to a fixed reference point (e.g., a point on Earth).

To detect touch input, transmit electrodes may be successively driven with a time-varying voltage, while the receive electrodes are held at ground and the current flowing into each receive electrode is measured. The electrodes are configured to exhibit a change in capacitance of at least one of the capacitors in the matrix in response to a touch input on top surface 204. Capacitors may be formed, for example, at each vertical intersection between a transmit electrode and a receive electrode.

Changes in capacitance may be detected by a detection circuit as time-varying voltages are applied. Based on the time of detection and the degree of attenuation and/or phase shift in a measured current, the capacitance under test can be estimated and a row and column identified as corresponding to a touch input. The structure of the transmit and receive electrodes is described in greater detail below with reference to FIGS. 3, 4A-4B, and 5A-5B.

Various aspects of touch sensor 208 may be selected to maximize the SNR of capacitance measurements and thus increase the quality of touch sensing. In one approach, the distance between the receive electrodes and a light-emitting display stack 214 is increased. This may be accomplished by increasing the thickness of optically clear adhesive layer 211, for example, which may reduce the noise reaching the receive electrodes. As non-limiting examples, the thickness of adhesive layer 211 may be less than 1 mm and in some embodiments less than 0.2 mm. The noise reaching the receive electrodes may alternatively or additionally be decreased by increasing the thickness of optically clear adhesive layer 211. Moreover, the relative arrangement of column and row conductors maximizes the average distance between the column and row conductors in the plane of touch sensor 208—e.g., in a direction substantially perpendicular to a direction in which light L is emitted from a light-emitting display stack 214.

Continuing with FIG. 2, light-emitting display stack 214, which may be a liquid crystal display (LCD) stack, organic light-emitting diode (OLED) stack, plasma display panel (PDP), or other flat panel display stack is positioned below the electrode layers 210 and 212. An optically clear adhesive (OCA) layer 216 joins a bottom surface of transmit electrode layer 212 to a top surface of display stack 214. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as a displayed image on top surface 204 of touch sheet 202.

Other embodiments are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 3 shows an example metal-mesh electrode matrix 300 that may be implemented in a capacitive touch sensor. As described above, electrode matrix 300 may be formed in electrode layers 210 or 212 via a variety of suitable processes, including deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing.

In this example, four electrodes (301, 302, 303, and 304) are shown. Along with a plurality of additional electrodes, electrodes 301-304 may form matrix 300. In this example, the electrodes extend principally along a first direction Y, and are arrayed periodically along a second direction X, perpendicular to Y. As such, electrodes 301-304 constitute column electrodes. Electrodes 301-304 are arrayed with a pitch of $p_e$, and thus a spatial frequency of $1/p_e$. Each electrode is defined by two electrode boundaries (e.g. electrode 301 is defined by boundaries 301a and 301b, electrode 302 is defined by boundaries 302a and 302b, etc.). Electrodes 301-304 are depicted as linked-diamond type electrodes, but other electrode shapes, including rectangular or concave polygonal shapes may be used. Electrodes 301-304 are flanked by inter-electrode alleys 305-309. The electrode boundaries thus also act as boundaries for the inter-electrode alleys. For example, inter-electrode alley 306 is defined by boundaries 301b and 302a, inter-electrode alley 307 is defined by boundaries 302b and 303a, etc.

Each electrode is comprised of a metal mesh 310. In this example, mesh 310 has a square unit cell with a mesh pitch of $p_m$. However, in other examples, other mesh configurations may be used. The unit cells of the mesh are arrayed periodically along axes U and V, which are respectively separated from electrode axes X and Y by an angle θ. A repeat length may be defined as the distance between instances of identical geometric relationship between the mesh and electrode boundaries in a periodic array of electrodes, where each electrode mesh is derived from a continuously extending mesh. As shown in FIG. 3A, each electrode 301, 302, 303, and 304 has a unique geometric relationship with the mesh contained therein (310a, 310b, 301c, and 310d, respectively). Indeed, each diamond of each electrode has a unique geometric relationship with the metal mesh.

Arbitrary combinations of $p_m$, $p_e$, and θ typically result in either an infinite repeat length, or a finite repeat length that is longer than the dimensions of a given touch sensor. In either case, the electrode structure is effectively non-repeating. Any attempt to step-and-repeat such a mesh results in a discontinuity in the mesh that may be perceived by the display user, even if the individual mesh lines are too small for the user to visually resolve. There are, however, discrete combinations of these values that result in a repeat length that is a small integer multiple n of the electrode pitch. These combinations thus enable a metal mesh electrode structure in which the geometric relationship between the mesh and the electrode boundaries exactly repeats over a finite, relatively small number of electrodes. This allows both the design process and the tool mastering process to employ extensive step-and-repeat of a relatively simple design element.

Such combinations simultaneously satisfy the following equations:

$$\theta = \arctan(a/b) \qquad \text{Equation (1)}$$

$$n*p_e = m*\text{sqrt}(a^2+b^2)*p_m \qquad \text{Equation (2)}$$

In Equation (1) and Equation (2), a, b, m, and n are positive integers. These values can be chosen to sufficiently approximate the values of $p_m$ and θ chosen to minimize moirés between the periodic display pixels and periodic mesh openings, for a given value of $p_e$. Such a mesh exactly repeats itself with period $(n*p_e)$ along the X and Y directions, so that only n unique electrodes are required regardless of the number of electrodes in the array. Furthermore, for electrodes of typical linked-diamond shape, the structure within each electrode repeats every n diamonds. These properties allow the tooling for an arbitrarily large electrode array to be designed and fabricated entirely of relatively small repeating units.

Figure 4A:
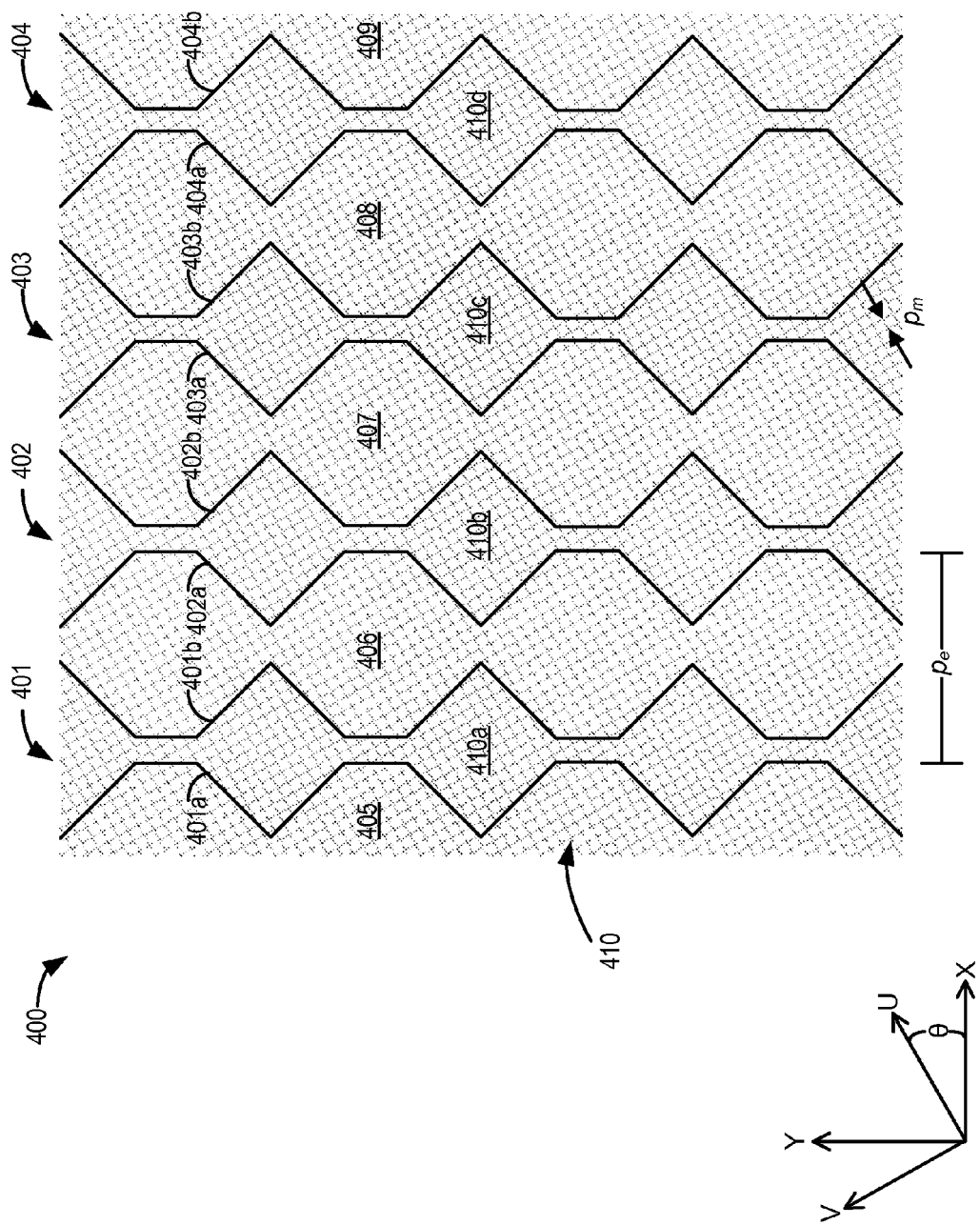
FIG. 4A shows a portion of an electrode array including metal mesh electrodes flanked by an electrically discontinuous alley mesh, the array having an infinite repeat length.

FIGS. 4A and 4B show an example electrode matrix 400 for a capacitive touch display system that does not satisfy Equations (1) and (2) as described herein. Four electrodes (401, 402, 403, and 404) are shown as representative electrodes of a plurality of electrodes that make up matrix 400. Each electrode is defined by a pair of boundaries (401a and 401b, 402a and 402b, 403a and 403b, 404a and 404b, respectively). Electrodes 401-404 extend principally along a first direction Y, and are arrayed periodically along a second direction X, perpendicular to Y with a pitch of $p_e$, and thus a spatial frequency of $1/p_e$. Electrodes 401-404 are flanked by inter-electrode alleys 405-409.

Metal mesh 410 forms electrodes 401-404. Mesh 410 has a square unit cell with a mesh pitch of $p_m$. The unit cells of the mesh 410 are arrayed periodically along axes U and V, which are respectively separated from electrode axes X and Y by an angle θ. Mesh 410 also covers inter-electrode alleys 405-409. The electrode mesh and alley mesh are continuous, except that within the inter-electrode alleys, mesh 410 is interrupted by numerous small gaps to make it electrically discontinuous.

In this example, the following parameters are targeted to minimize moirés when used with an LCD panel comprising square RGB pixels on a 630 μm pitch: θ=29°, $p_e$=6.5 mm, $p_m$=360 μm. Because arctan (29°) is an irrational number, there exist no integers a and b that satisfy equation (1) above. There also exist no integers a, b, m, and n that satisfy equation (2). The repeat length of this matrix is infinite. Any attempt to step-and-repeat a matrix having these parameters, regardless of the size of the repeating unit, results in a discontinuity of the mesh at the edges of adjacent repeated units.

FIG. 4B shows a magnified view 420 of the mesh misalignment at the common edges of four repeating units 421, 422, 423, and 424 which intersect at unit edges 425 and 426. In particular, discontinuities in the electrode mesh may be seen at 430, while discontinuities in the alley mesh may be seen at 431. These mesh discontinuities result in an excess of pixel occlusion that is perceptible to the display user as a grid of darkened lines along the edges of the repeated units.

Figure 5A:
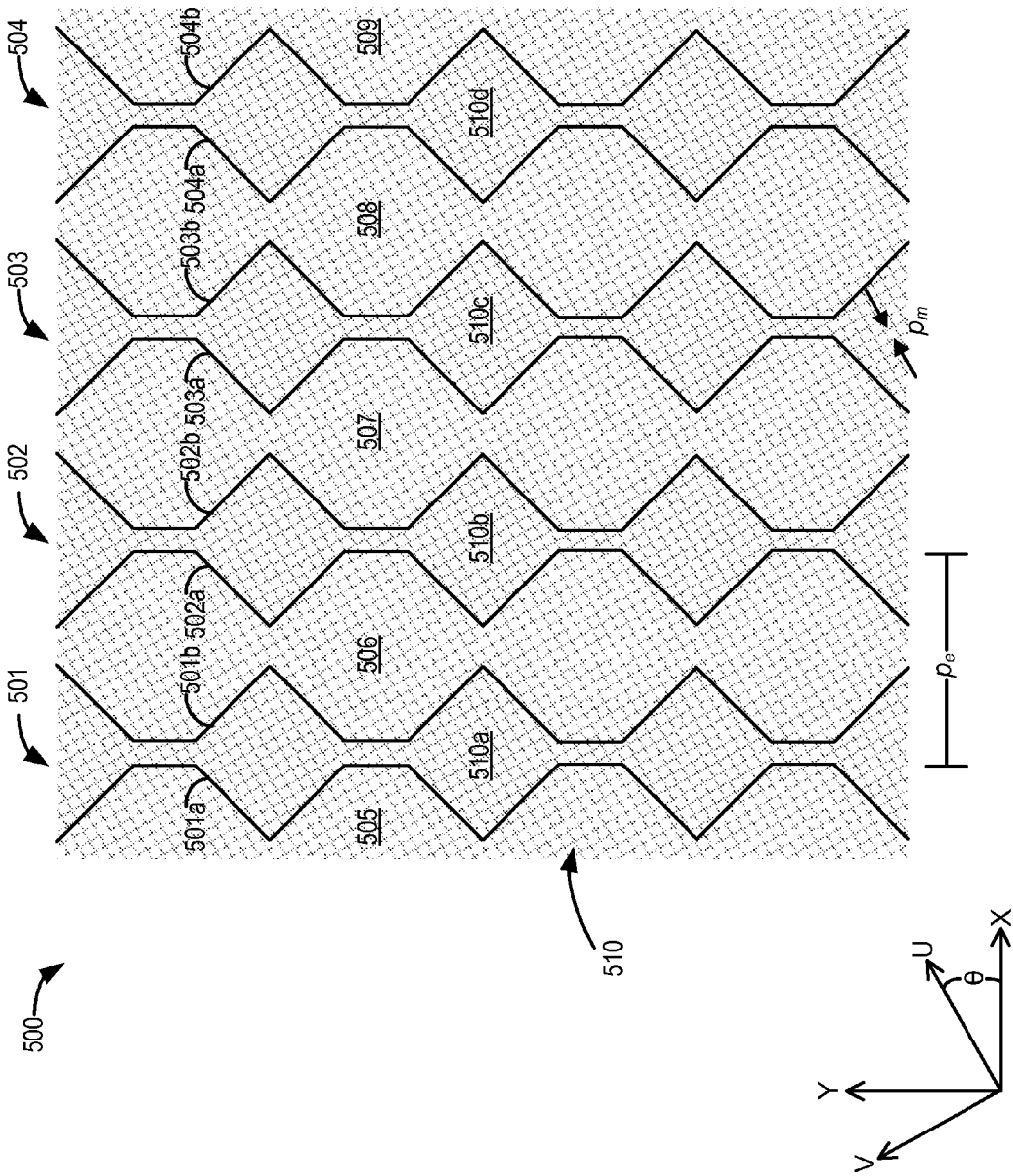
FIG. 5A shows a portion of an electrode array including metal mesh electrodes flanked by an electrically discontinuous alley mesh, the array, having a finite repeat length.
Figure 5B:
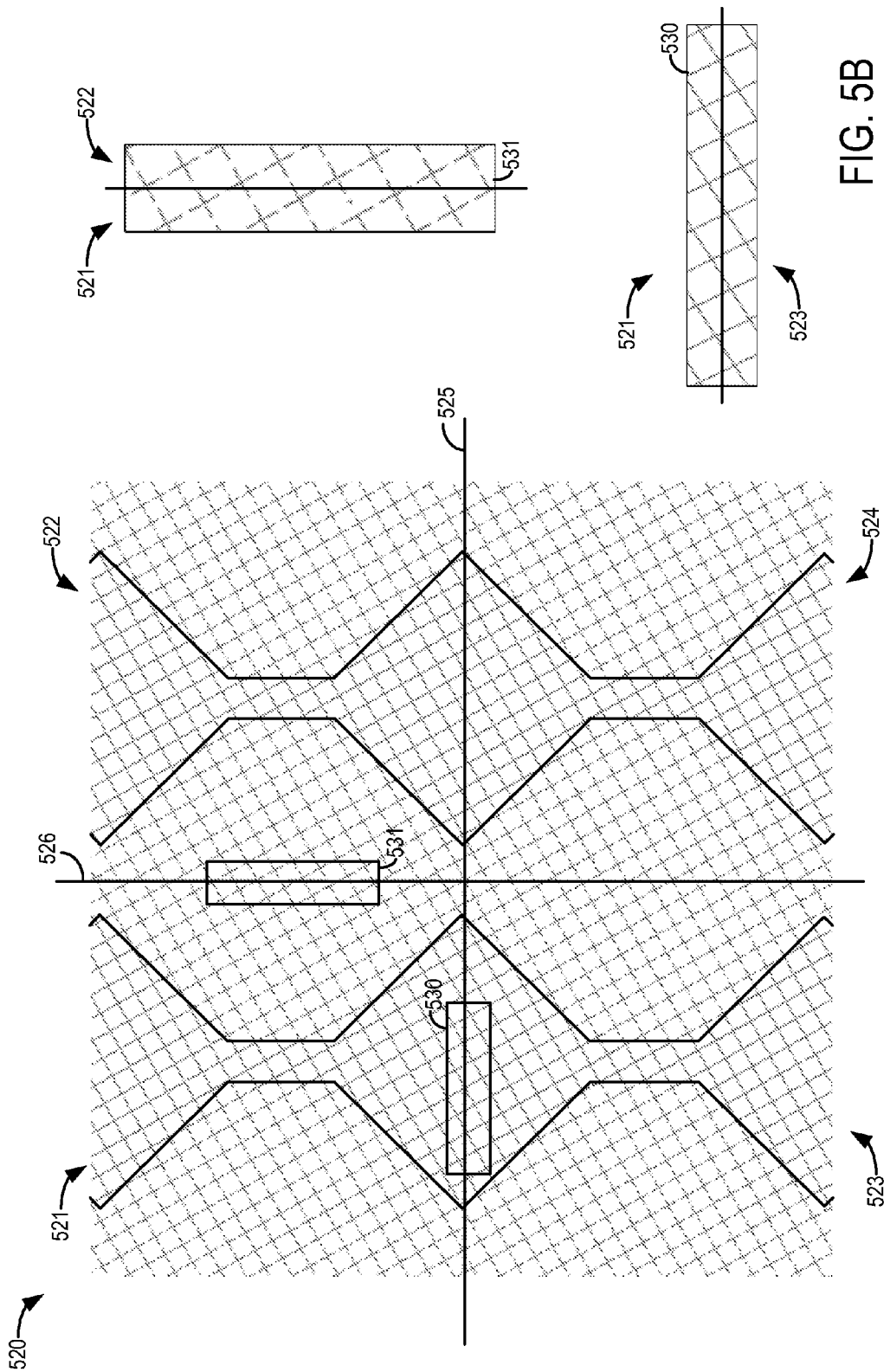
FIG. 5B shows a detailed view of edges of adjacent step-and-repeat units as shown in FIG. 5A.

FIGS. 5A and 5B show an example electrode matrix 500 for a capacitive touch display system that does satisfy both Equations (1) and (2) as put forth herein. Four electrodes (501, 502, 503, and 504) are shown as representative electrodes of a plurality of electrodes that make up matrix 500. Each electrode is defined by a pair of boundaries (501a and 501b, 502a and 502b, 503a and 503b, 504a and 504b, respectively). Electrodes 501-504 extend principally along a first direction Y, and are arrayed periodically along a second direction X, perpendicular to Y with a pitch of $p_e$, and thus a spatial frequency of $1/p_e$. Electrodes 501-504 are flanked by inter-electrode alleys 505-509.

Metal mesh 510 forms electrodes 501-504. Mesh 510 has a square unit cell with a mesh pitch of $p_m$. The unit cells of the mesh 510 are arrayed periodically along axes U and V, which are respectively separated from electrode axes X and Y by an angle θ. Mesh 510 also covers inter-electrode alleys 505-509. The electrode mesh and alley mesh are continuous, except that within the inter-electrode alleys, mesh 510 is interrupted by numerous small gaps to make it electrically discontinuous.

The example in FIG. 5A shows a unit of an electrode matrix with a finite repeat length, in which a=5, b=9, m=7, and n=4. Holding $p_e$ constant at 6.5 mm, $p_m$≈360.8 μm and θ≈29.06°, sufficiently close to the target parameters to minimize the visibility of moirés. Because tan (θ) is a rational number, and this combination of a, b, m, n, $p_e$, and $p_m$ satisfies Equation (2), this matrix is exactly periodic along X and Y with a repeat length of 26 mm (4*$p_e$), and any 26 mm×26 mm unit can be stepped-and-repeated with exact alignment of the mesh at the edges of adjacent units.

FIG. 5B shows a magnified view 520 of the mesh alignment at the common edges of four repeating units 521, 522, 523, and 524 which intersect at unit edges 525 and 526. In particular, the continuity in the electrode mesh may be seen at 530, while continuity in the alley mesh may be seen at 531.

When used in a touch display system having a diagonal display dimension of 84", this particular step-and-repeat results in an approximately 3000-fold reduction in the complexity of CAD data required to represent the electrode matrix and its tooling.

By appropriate choice of a, b, m, and n, an electrode matrix can approximate any desired θ and pm closely enough to not adversely affect moiré performance, typically without n being greater than 16. For example values for a, b, m, and n may be selected such that 1≤a≤20; 1≤b≤20; 1≤m≤16; and 1≤n≤16. More specifically, values for a, b, m, and n may be selected such that 3≤a≤13; 4≤b≤16; 1≤m≤8; and 1≤n≤8.

Although the example shown in FIGS. 5A-5B includes a mesh having square openings, the proposed solution is equally applicable to a mesh having openings of any shape, provided the unit cell of the mesh is square.

Figure 6:
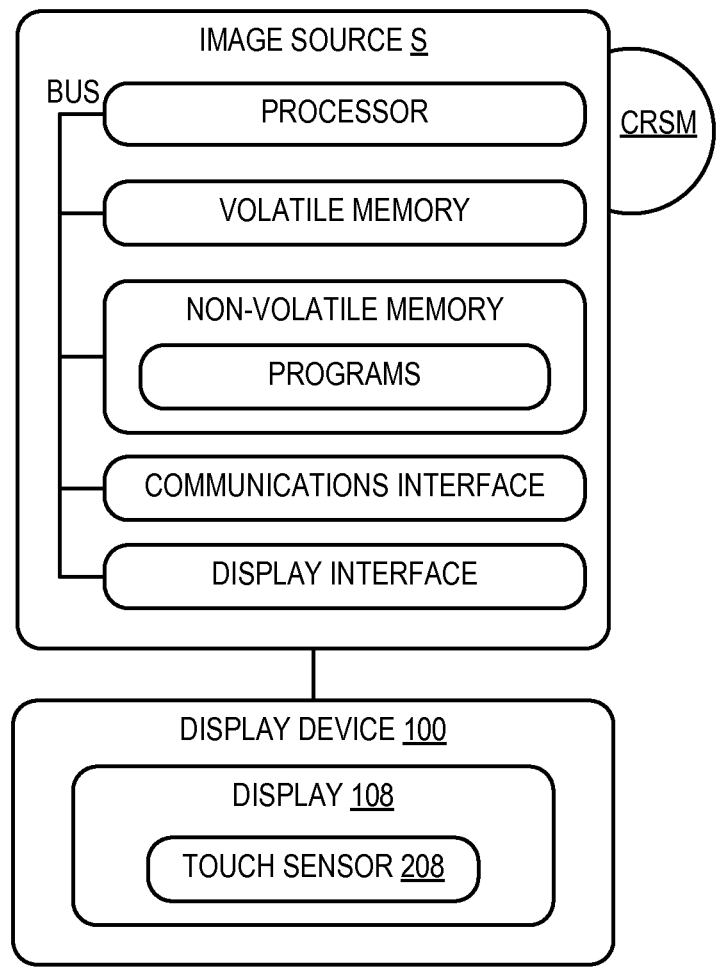
FIG. 6 is a schematic view of an image source for the display device of FIG. 1.

FIG. 6 illustrates an exemplary image source S according to one embodiment of the present invention. As discussed above, image source S may be an external computing device, such as a server, laptop computing device, set top box, game console, desktop computer, tablet computing device, mobile telephone, or other suitable computing device. Alternatively, image source S may be integrated within display device 100.

Image source S includes a processor, volatile memory, and non-volatile memory, such as mass storage, which is configured to store software programs in a non-volatile manner. The stored programs are executed by the processor using portions of volatile memory. Input for the programs may be received via a variety of user input devices, including touch sensor 208 integrated with display 108 of display device 100. The input may be processed by the programs, and suitable graphical output may be sent to display device 100 via a display interface for display to a user.

The processor, volatile memory, and non-volatile memory may be formed of separate components, or may be integrated into a system on a chip, for example. Further the processor may be a central processing unit, a multi-core processor, an ASIC, system-on-chip, or other type of processor. In some embodiments, aspects of the processor, volatile memory and non-volatile memory may be integrated into devices such as field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

A communications interface may also be provided to communicate with other computing devices, such as servers, across local and wide area network connections, such as the Internet.

The non-volatile memory may include removable media and/or built-in devices. For example, non-volatile memory may include optical memory devices (e.g., CD, DVD, HD-DVD, Blu-Ray Disc, etc.), semiconductor memory devices (e.g., FLASH, EPROM, EEPROM, etc.) and/or magnetic memory devices (e.g., hard disk drive, floppy disk drive, tape drive, MRAM, etc.), among others.

Removable computer readable storage media (CRSM) may be provided, which may be used to store data and/or instructions executable to implement the methods and processes described herein. Removable computer-readable storage media may take the form of CDs, DVDs, HD-DVDs, Blu-Ray Discs, EEPROMs, and/or floppy disks, among others.

Although the non-volatile memory and CRSM are physical devices configured to hold instructions for a duration of time, typically even upon power down of the image source, in some embodiments, aspects of the instructions described herein may be propagated by a computer readable communication medium, such as the illustrated communications bus, in a transitory fashion by a pure signal (e.g., an electromagnetic signal, an optical signal, etc.) that is not held by a physical device for at least a finite duration.

The term "program" may be used to describe software firmware, etc. of the system that is implemented to perform one or more particular functions. In some cases, such a program may be instantiated via the processor executing instructions held by non-volatile memory, using portions of volatile memory. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

In one example, an array of electrodes is provided, comprising a plurality of electrodes, each electrode extending along a first direction X and periodically arrayed along a second direction Y perpendicular to X at a pitch $p_e$, wherein each electrode comprises a continuous periodic metal mesh having a square unit cell of edge length $p_m$, the square unit cell having axes displaced by an oblique angle $\theta$ from X and Y, wherein $\theta$=arctan (a/b) and $p_m=n*p_e/(m*sqrt(a^2+b^2))$, and a, b, m, and n are positive integers. In such an example, inter-electrode alleys between the electrodes may additionally or alternatively be filled with an electrically discontinuous opaque mesh having a unit cell of edge length $p_m$ aligned with meshes of the electrodes. In such an example, the electrodes may additionally or alternatively be concave polygonal in shape. In such an example, the electrodes may additionally or alternatively be linked-diamond type electrodes. In such an example, the array of electrodes may additionally or alternatively comprise a plurality of repeating electrode units comprising one or more electrode segments extending along the direction X and repeating along the direction X and the direction Y at a period of $_n*p_e$. In such an example, the array of electrodes may be additionally or alternatively configured such that 1≤a≤20, 1≤b≤20, 1≤m≤16, and 1≤n≤16. Any or all of the above-described examples may be combined in any suitable manner in various implementations.

In another example, a capacitive touch sensor is provided, comprising one or more arrays of electrodes, each array of electrodes comprising a plurality of electrodes, each electrode extending along a first direction X, and periodically arrayed along a second direction Y perpendicular to the first direction X at a pitch $p_e$, wherein each electrode comprises a continuous periodic metal mesh having a square unit cell of edge length $p_m$, the square unit cell having axes displaced by an oblique angle $\theta$ from the X and Y, wherein $\theta$=arctan (a/b) and $p_m=n*p_e/(m*sqrt(a^2+b^2))$, and a, b, m, and n are positive integers. In such an example inter-electrode alleys between the electrodes may additionally or alternatively be filled with an electrically discontinuous opaque mesh having a unit cell of edge length $p_m$ aligned with meshes of the electrodes. In such an example the electrodes may additionally or alternatively be concave polygonal in shape. In such an example the electrodes may additionally or alternatively be linked-diamond type electrodes. In such an example, the capacitive touch sensor may additionally or alternatively comprise a plurality of repeating electrode units comprising one or more electrode segments extending along the direction X, and repeating along the direction X and the direction Y at a period of $_n*p_e$. In such an example, the capacitive touch sensor may additionally or alternatively be configured such that 1≤a≤20, 1≤b≤20, 1≤m≤16, and 1≤n≤16. Any or all of the above-described examples may be combined in any suitable manner in various implementations.

In yet another example, a touch sensing display device is provided, comprising: a display device including periodically arrayed pixels, and a capacitive touch sensor, comprising one or more arrays of electrodes, each array of electrodes comprising a plurality of electrodes, each electrode extending along a first direction X, and periodically arrayed along a second direction Y perpendicular to the first direction X at a pitch $p_e$, wherein each electrode comprises a continuous periodic metal mesh having a square unit cell of edge length $p_m$, the square unit cell having axes displaced by an oblique angle $\theta$ from X and Y, wherein $\theta$=arctan (a/b) and $p_m=n*p_e/(m*sqrt(a^2+b^2))$, and a, b, m, and n are positive integers. In such an example, inter-electrode alleys between the electrodes may additionally or alternatively be filled with an electrically discontinuous opaque mesh having a unit cell of edge length $p_m$ aligned with meshes of the electrodes. In such an example, the electrodes may additionally or alternatively be concave polygonal in shape. In such an example, the electrodes may additionally or alternatively be linked-diamond type electrodes. In such an example, the touch sensing display device may additionally or alternatively comprise a plurality of repeating electrode units comprising one or more electrode segments extending along the direction X and repeating along the direction X and the direction Y directions at a period of $_n*p_e$. In such an example, the touch sensing display device may additionally or alternatively be configured such that 1≤a≤20, 1≤b≤20, 1≤m≤16, and 1≤n≤16. In such an example, the display device may additionally or alternatively have a diagonal display dimension of at least 0.5 meters. In such an example, the one or more arrays of electrodes may additionally or alternatively comprise a receive electrode array and a transmit electrode array. Any or all of the above-described examples may be combined in any suitable manner in various implementations.

The invention claimed is:

1. An array of electrodes, comprising:
a plurality of electrodes, each electrode extending along a first direction X, and periodically arrayed along a second direction Y perpendicular to X at a pitch $p_e$;
wherein each electrode comprises a continuous periodic metal mesh having a square unit cell of edge length $p_m$, the square unit cell having axes displaced by an oblique angle $\theta$ from X and Y;
wherein $\theta = \arctan(a/b)$ and $p_m = n*p_e/(m*sqrt(a^2+b^2))$; and
a, b, m, and n are positive integers selected such that an intersection between the metal mesh and an edge of an electrode is repeated every n electrodes.

2. The array of electrodes of claim 1, wherein inter-electrode alleys between the electrodes are filled with an electrically discontinuous opaque mesh having a unit cell of edge length $p_m$ aligned with meshes of the electrodes.

3. The array of electrodes of claim 1, wherein the electrodes are concave polygonal in shape.

4. The array of electrodes of claim 3, wherein the electrodes are linked-diamond type electrodes.

5. The array of electrodes of claim 1, further comprising:
a plurality of repeating electrode units comprising one or more electrode segments extending along the direction X, and repeating along the direction X and the direction Y at a period of $_n*p_e$.

6. The array of electrodes of claim 1, wherein:
$1 \leq a \leq 20$;
$1 \leq b \leq 20$;
$1 \leq m \leq 16$; and
$1 \leq n \leq 16$.

7. A capacitive touch sensor, comprising:
one or more arrays of electrodes, each array of electrodes comprising:
a plurality of electrodes, each electrode extending along a first direction X, and periodically arrayed along a second direction Y perpendicular to the first direction X at a pitch $p_e$;
wherein each electrode comprises a continuous periodic metal mesh having a square unit cell of edge length $p_m$, the square unit cell having axes displaced by an oblique angle $\theta$ from X and Y;
wherein $\theta = \arctan(a/b)$ and $p_m = n*p_e/(m*sqrt(a^2+b^2))$; and
a, b, m, and n are positive integers selected such that an intersection between the metal mesh and an edge of an electrode is repeated every n electrodes.

8. The capacitive touch sensor of claim 7, wherein inter-electrode alleys between the electrodes are filled with an electrically discontinuous opaque mesh having a unit cell of edge length $p_m$ aligned with meshes of the electrodes.

9. The capacitive touch sensor of claim 7, wherein the electrodes are concave polygonal in shape.

10. The capacitive touch sensor of claim 9, wherein the electrodes are linked-diamond type electrodes.

11. The capacitive touch sensor of claim 7, further comprising:
a plurality of repeating electrode units comprising one or more electrode segments extending along the direction X, and repeating along the direction X and the direction Y at a period of $_n*p_e$.

12. The capacitive touch sensor of claim 7, wherein:
$1 \leq a \leq 20$;
$1 \leq b \leq 20$;
$1 \leq m \leq 16$; and
$1 \leq n \leq 16$.

13. A touch sensing display device, comprising:
a display device including periodically arrayed pixels; and
a capacitive touch sensor, comprising:
one or more arrays of electrodes, each array of electrodes comprising:
a plurality of electrodes, each electrode extending along a first direction X, and periodically arrayed along a second direction Y perpendicular to the first direction X at a pitch $p_e$;
wherein each electrode comprises a continuous periodic metal mesh having a square unit cell of edge length $p_m$, the square unit cell having axes displaced by an oblique angle $\theta$ from X and Y;
wherein $\theta = \arctan(a/b)$ and $p_m = n*p_e/(m*sqrt(a^2+b^2))$; and
a, b, m, and n are positive integers selected such that an intersection between the metal mesh and an edge of an electrode is repeated every n electrodes.

14. The touch sensing display device of claim 13, wherein inter-electrode alleys between the electrodes are filled with an electrically discontinuous opaque mesh having a unit cell of edge length $p_m$ aligned with meshes of the electrodes.

15. The touch sensing display device of claim 13, wherein the electrodes are concave polygonal in shape.

16. The touch sensing display device of claim 15, wherein the electrodes are linked-diamond type electrodes.

17. The touch sensing display device of claim 13, further comprising:
a plurality of repeating electrode units comprising one or more electrode segments extending along the direction X, and repeating along the direction X and the direction Y at a period of $_n*p_e$.

18. The touch sensing display device of claim 13, wherein:
$1 \leq a \leq 20$;
$1 \leq b \leq 20$;
$1 \leq m \leq 16$; and
$1 \leq n \leq 16$.

19. The touch sensing display device of claim 13, wherein the display device has a diagonal display dimension of at least 0.5 meters.

20. The touch sensing display device of claim 13, wherein the one or more arrays of electrodes comprise a receive electrode array and a transmit electrode array.

* * * * *